R. D. CARSCALLEN.
Saw-Sets.

No. 147,746.  Patented Feb. 24, 1874.

WITNESSES.  INVENTOR
Robert D. Carscallen.
By Leggett & Leggett,
Attorneys.

UNITED STATES PATENT OFFICE.

ROBERT D. CARSCALLEN, OF LOGANSPORT, INDIANA.

IMPROVEMENT IN SAW-SETS.

Specification forming part of Letters Patent No. 147,746, dated February 24, 1874; application filed October 1, 1873.

*To all whom it may concern:*

Be it known that I, ROBERT D. CARSCALLEN, of Logansport, in the county of Cass and State of Indiana, have invented certain new and useful Improvements in Saw-Sets; and I do hereby declare the following to be a full, clear, and exact description of the invention, such as will enable others skilled in the art to which it pertains to make and use it, reference being had to the accompanying drawings, which form part of this specification.

Figure 1:
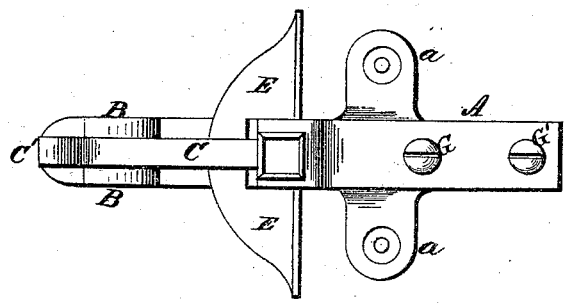
Figure 2:
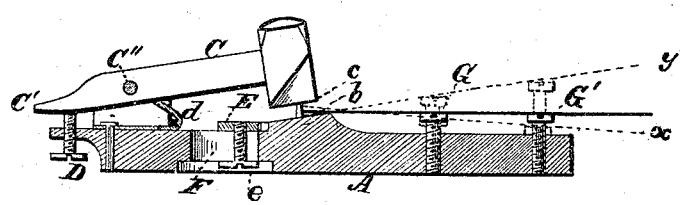

My invention relates to improvements in saw-sets, and consists as follows:

In the drawings, Figure 1 represents a plan view, and Fig. 2 a longitudinal section.

A represents a solid metal base or anvil, provided with brackets or portions $a$, by which it is attached to a table or other object. Pivoted at one end, between the uprights B of this base, is a hammer-headed arm, C. The face $c$ of this hammer-head is beveled, as shown, to conform to the raised bevel portion $b$ of the base A. A set or tension screw, D, in the end of the base A, impinges against the short arm C' of the hammer-headed arm C. $d$ is a stout spring attached to the base A, employed to keep the hammer in a raised position, as shown. E is a guide-plate, adjustable horizontally by means of a set-screw, $e$, working in a slot, F, in the base A. G G' are set-screws, which form an adjustable rest for the saw-blade.

The operation of the machine is as follows: The distance of the face $c$ of the hammer-head C from the beveled raised portion $b$ of the base A is first gaged to any desired height by means of the set-screw D, to compensate for the thickness of the saw or the force of blow. The saw is then laid horizontally on the set-screws G G', (see full lines, Fig. 2,) the screws being on the same level, the teeth of the saw resting on the part $b$ beneath the hammer-head. The gage-plate E is then brought up against the points of the teeth and gaged or set, and held at any point by the set-screw $e$ for any desired depth or set of the tooth. A blow with a hammer on the hammer-head is then given, which brings the hammer-head down on the tooth and sets it, the spring $d$ returning the hammer-head to its original position.

Should it be desired to give a greater angle or set to the tooth, the set-screws G G' are lowered, the end one being, according to the required angle of the tooth, lowered greater or less than the screw G, bringing the saw in the position shown in dotted lines $x$, Fig. 2, the teeth still resting on the point $b$. On the other hand, should it be desired only to give a very slight angle, or only to straighten the teeth of the saw, the end set-screw may be raised and the saw brought in the position shown in dotted lines $y$, Fig. 2. By means of these double screws G G', placed one behind the other, and gage-plate E, operating as described, the degree of the set and angle of a saw-tooth may be delicately and nicely regulated, and in a nicer and minuter degree than has ever before been done.

Having thus described my invention, what I claim as new, and desire to secure by Letters Patent, is—

The saw-set herein described, consisting of the slotted base or anvil A B F, beveled face $c$, pivoted spring hammer-headed arm C C' C'' $d$ $c$, set or tension screw D, adjustable gage-plate E $e$, and adjustable set-screw rests G G', all constructed, arranged, and operating substantially as described and set forth.

In testimony that I claim the foregoing I have hereunto set my hand this 10th day of September, 1873.

ROBERT D. CARSCALLEN.

Witnesses:
 J. R. McNARY,
 J. T. McNARY.